Aug. 21, 1962     S. AUSNIT     3,049,779
SEPARABLE FASTENER
Filed May 27, 1960
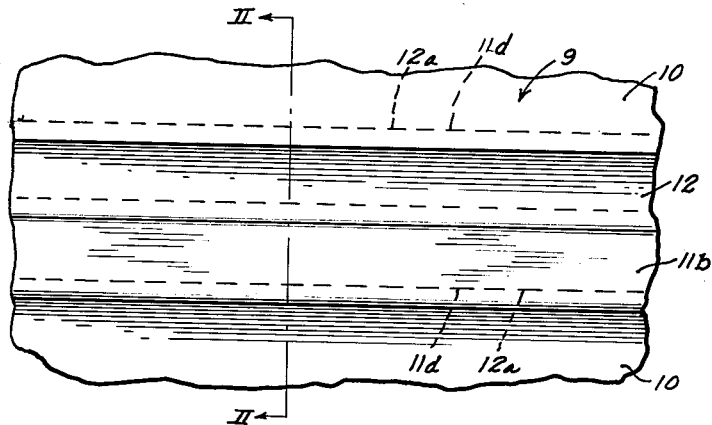
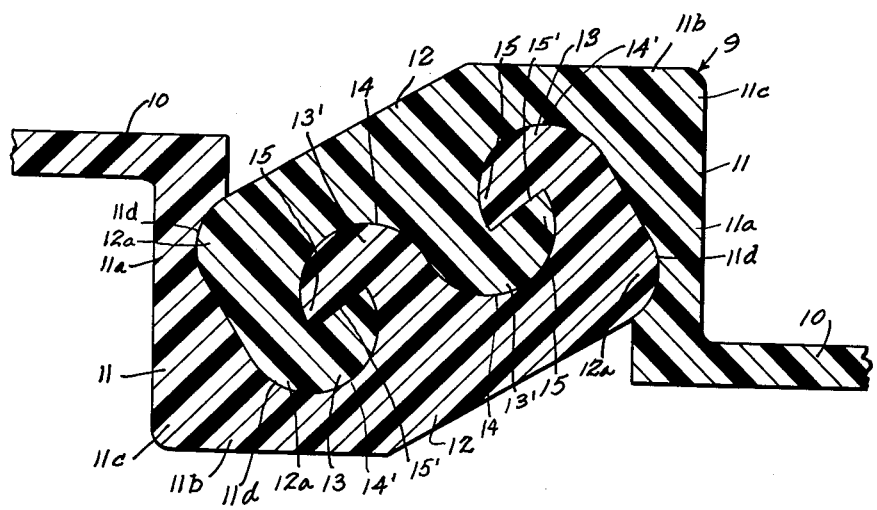
Inventor
Steven Ausnit
By Hill, Sherman, Meroni, Gross & Simpson Attys United States Patent Office 3,049,779
Patented Aug. 21, 1962

3,049,779
SEPARABLE FASTENER
Steven Ausnit, 124 E. 61st St., New York, N.Y.
Filed May 27, 1960, Ser. No. 32,278
7 Claims. (Cl. 24—201)

This invention relates to clasp fasteners of the type comprising two strips of an elastic or resilient material, each of which is provided with a plurality of grooves and ridges extending lengthwise of the strip with the ridges provided with hook-like projections forming shoulders adapted to oppose one another and thereby resist forces tending to separate the strips and open the fastener.

It has been found that the previously known fasteners of this kind suffer the drawback that the two interengaging components may relatively easily become disengaged when the fastener is subjected to repeated bending or flexing. Under such bending or flexing action, a pressure will be exerted in a direction normal to the planes of the strips tending to separate the two components by forcing the ridges from the grooves.

An object of the present invention is to provide a new and improved fastener structure including a pair of strips each having ribs and grooves which are inclined relative to the plane of the strip so that when the ribs and grooves on the strips are engaged together, a pressure exerted in a direction normal to the planes of the strips will not as readily tend to separate the ridges or hook-like projections from the grooves.

According to the present invention, each of the strips has an angular linking portion which extends away from the strip to which it is joined and across and beyond the plane of the other of the strips when the strips are in assembly so that the junction of the angular linking portion is beyond the plane of the other of the strips to resist the direction of pull exerted through the strips. Joined at the outer end of the angular linking portion is a web having a series of hook-like projections and a series of hook-like grooves which are disposed along a plane inclined to the plane of the strip that carries the web.

The details of the invention will be more fully understood from the following description with reference to the drawings, in which:

FIGURE 1 is a fragmentary top view of a fastener shown in a closed position; and FIGURE 2 is an enlarged fragmentary cross-sectional view taken substantially on the line II—II looking in the direction indicated by the arrows, as shown in FIGURE 1.

The fastener structure of my invention is indicated generally by the reference numeral 9 and comprises two identical flexible strips 10 formed of a resilient material, such as a thermoplastic material, which may be molded or extruded into the desired finished shape. The strips may be made of thermoplastic synthetic resin materials such as polyvinyl chloride, polyvinylidene chloride, halogenated polyethylene, polyvinyl acetate, and polyethylene, and copolymers, heteropolymers and mixtures thereof. Such materials are substantially impervious to air and moisture, and may be prepared in suitable thin resilient sheets which can be translucent, and substantially transparent, if desired.

Since each of the strips are substantially identical, a description of one of the strips will suffice for both of the strips and the same reference numerals have been applied to both of the strips.

The flexible fastener strip 10 has an angular linking portion 11 disposed at one end which is comprised of a strip leg 11a and a web leg 11b. Joined with the web leg 11b is an inclined web 12 comprising a thickened marginal portion of the strip. It will further be noted the angular linking portion is thickened relative to the thickness of the strip 10.

The inclined web has a pair of hook-like projections 13 and 13' spaced along the length of the web 12 and disposed in planes generally normal to the plane of the web 12 from which they depend. It will be noted that the hook-like projection 13 is disposed at a remote end of the strip 10 and it will further be noted that the hook-like projection 13' is disposed between the hook 13 and the angular linking portion 11.

The inclined web 12 is further provided with hook-shaped grooves 14 and 14' with the groove 14 being disposed at the remote end of the strip and defined by adjacent hook-like projections and the web. The groove 14' is disposed between and adjacent hook-like projection 13' and the angular linking portion 11.

Each of the hook-like projections has an outer end 15. These ends 15 on each web 12 extend generally towards a juncture 11c between the strip and web legs 11a and 11b. In other words the hook-like projections each include a rib portion formed by the body thereof, and a hook portion formed by the end 15 with the rib portion projecting from the plane of the web toward its respective strip opposing longitudinal pull on the strips away from said web.

Each of the ends or tooth-like projections is provided with a shoulder 15. These shoulders 15' are constituted by plane surfaces, which, when the fastener is in its normal, closed position, are engaged with one another. As illustrated, the shoulders 15' are disposed in planes which are inclined slightly with respect to the plane of the web 12.

The strip leg 11a is provided with a strip leg grooved area 11d for receipt of a web heel 12a. The web heel 12a is disposed at the remote end of the web 12. When the hook-like projections on the webs are engaged in the grooves the web heels on the webs are engaged in the strip leg grooved areas 11d to further lock the strips in assembly with one another to further resist separation of the webs 12.

The above described fastener 9 is advantageous since not only are the webs 12 when engaged together disposed in inclined planes relative to the planes of the flexible strips 10, but further since the web legs 11b are disposed above and below the planes of the strips 10 they enable further resistance to be developed to prevent separation of the hook-like projections and the grooves when engaged together.

The webs on the strips may be assembled together by guiding the hook-like projections 13, 13' into the hook-like grooves and by guiding the web heels 12a into the strip leg grooved areas 11d. The strips may be separated by initially disengaging the web heel 12a with respect to the strip leg grooved areas 11d and then by disengaging the hook-like projections from the grooves in which they are engaged.

It will be understood that modifications and variations may be effected without departing from the scope of the novel concepts of the present invention.

I claim as my invention:

1. A fastener structure including a pair of flexible strips which are disposed in parallel planes with respect to one another when in assembly, said strips having inclined webs which are disposed in parallel relation with respect to one another and which are of such length that they extend beyond the plane of at least one of said strips so as to resist the direction of pull exerted through said strips, angular linking portions on each of said strips with each of said angular linking portions joining one of said strips and webs in assembly together, each of the angular linking portions extending away from the strip to which it is attached and across and beyond the plane of the other of the strips when the strips are in assembly so that the junction of the angular linking portion is beyond the plane of the other of the strips so as to further resist the direction of pull exerted through said strips, and a series of hook-like projections having rib and hook portions and a series of hook-like grooves on each of said webs, the hook-like projections on the web of one of said strips being engageable in the grooves on the web of the other strip and vice versa to sustain the strips in assembly together, each of said webs facing toward its respective strip with the rib portion extending toward the strip opposing a longitudinal pull on the strips away from said web.

2. A fastener structure including a pair of flexible strips which are disposed in parallel planes with respect to one another when in assembly, each of said strips having a pair of angular linking portions each comprised of a strip leg and a web leg disposed in angular relation to one another, said strips having inclined webs which are disposed in parallel relation with respect to one another and which are of such length that they extend beyond the plane of at least one of said strips on opposite sides of the strip so as to resist the direction of pull exerted through said strips, and interengageable hook-like groove and projection means on said webs, the strip leg joining the strip with the web leg and the web leg joining the web with the strip leg, each of said strip legs having a strip leg grooved area and each of said webs having a web end, the web end on one strip being engageable within the strip leg grooved area on another strip and vice versa to back-up and to further resist separation of the interengageable hook-like groove and projection means on the webs, said hook-like projection means including rib and hook portions with the rib portions projecting toward their respective strips to resist longitudinal pull along the strips.

3. A fastener structure including a pair of flexible fastener strips which are disposed in parallel planes to one another when in assembly, each of said strips having a strip leg which extends in a first lateral direction from the strip and a web which is inclined with respect to the strip with means for connecting the web to the strip leg, the webs of each of the strips disposed in parallel relation with respect to each other, and interengageable hook-like groove and projection means on the webs with the projection means including a rib portion and a hook portion with the rib portion extending in a second lateral direction opposite said first direction back toward the strip.

4. A fastener structure including a pair of flexible strips which are disposed in parallel planes with respect to one another when in assembly, said strips having inclined webs which are disposed in parallel relation with respect to one another and which are of such a length that a portion of the web of at least one of the strips extends laterally beyond the plane of the other of said strips so as to resist the direction of pull exerted through said strips, and a series of hook-like projections having rib and hook portions and a series of hook-like grooves on each of said webs, the hook-like projections on the web of one of said strips being engageable in the grooves on the web of the other strip and vice versa to sustain the strips in assembly together, each of said webs facing toward its respective strip with the rib portions extending toward the strip opposing longitudinal pull through the strips away from said webs.

5. A fastener structure including a pair of flexible strips which are disposed in parallel planes with respect to one another when in assembly and which each have an angular linking portion, said angular linking portions having inclined webs which are disposed in parallel relation with respect to one another and which are of such a length that a portion of the web of at least one of the strips extends laterally beyond the plane of the other of said strips on opposite sides of the strip so as to resist the direction of pull exerted through said strips, and a pair of hook-like projections having rib and hook portions and a pair of hook-like grooves on each of said webs, the pair of hook-like projections on the web of one of said strips being engageable in the pair of grooves on the web of the other strip and vice versa to sustain the strips in assembly together, the hook portions on each web having outer ends turned and extended generally toward a juncture between the web bearing said hook portions and a linking portion joining the web with the strip, said webs facing toward their respective strips with the rib portions extending toward their strip opposing a longitudinal pull on the strips away from the web.

6. A fastener structure including a pair of flexible strips engageable together when in assembly, said strips having inclined webs which are disposed in parallel relation with respect to one another and which are of such a length that a portion of the web of at least one of the strips extends laterally beyond the other of said strips so as to resist the direction of pull exerted through said strips, and a series of hook-like projections with rib and hook portions and a series of hook-like grooves on each of said webs, the hook-like projections on the web of one of said strips being engageable in the grooves on the web of the other strip and vice versa to sustain the strips in assembly together, each of said webs facing toward its respective strip with the rib portions extending toward the respective strips opposing a longitudinal pull on the strips away from said webs.

7. A fastener structure including a pair of flexible strips which are disposed in parallel planes with respect to one another when in assembly, each of said strips having a pair of angular linking portions each comprised of a strip leg and a web leg disposed in angular relation to one another, said strips having inclined webs, said webs including integral interengageable hook-like groove means and projection means having rib and hook portions on said webs, the strip leg joining the strip and the web leg joining the web with the strip leg, said webs facing toward their respective strips with the rib portions projecting toward the strips to resist a longitudinal pull on the strips away from said webs, said webs disposed in parallel relation with respect to one another and being of such a length that at least a portion of said webs extends laterally beyond the plane of the opposing strip.

References Cited in the file of this patent

UNITED STATES PATENTS

| | | |
|---|---|---|
| 2,353,858 | Tedesco | July 18, 1944 |
| 2,823,721 | Sevc | Feb. 18, 1958 |

FOREIGN PATENTS

| | | |
|---|---|---|
| 80,891 | Denmark | Apr. 30, 1956 |
| 497,015 | Italy | Aug. 21, 1954 |